United States Patent Office 3,014,058
Patented Dec. 19, 1961

3,014,058
METHOD OF MAKING METHYLENE
BISPHOSPHORUS ESTERS
Joe R. Willard, Middleport, N.Y., and John F. Henahan, South River, N.J., assignors to FMC Corporation, a corporation of Delaware
No Drawing. Filed Sept. 5, 1958, Ser. No. 759,142
4 Claims. (Cl. 260—46)

This invention relates to methods for preparing bis(S-[dialkoxyphosphinyl]mercapto)-methanes and bis(S-[dialkoxyphosphinothioyl]mercapto)-methanes by the reaction of a metallic salt of a thio- or dithiophosphoric acid, with dibromomethane or bromochloromethane. It aims to provide a novel method for the preparation of the indicated compounds, characterized by simplicity of operation, short reaction times and high yields of the desired end products.

In our copending application Serial Number 597,886, filed July 16, 1956, now Patent No. 2,873,228, of which this application is a continuation-in-part, we have described and claimed the compound bis(S-[diethoxyphosphinothioyl]mercapto)-methane as an extremely active insecticide. This compound is one of a class of compounds having the general formula

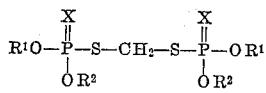

where X is oxygen or sulfur and $R_1$ and $R_2$ are organic radicals.

According to the instant invention, such compounds are prepared by reacting a soluble salt of a compound of the formula

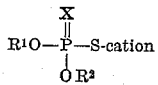

where X is oxygen or sulfur and $R^1$ and $R^2$ are organic radicals, with a reactant of the class consisting of dibromomethane and bromochloromethane. The reaction is carried out by dissolving the salt in an appropriate solvent, adding a mol of the dihalomethane to two molar equivalents of the metal or other salt and heating the mixture until reaction is complete, with the formation of the desired ester and halide.

Surprisingly enough the reaction will not occur unless one or both of the halogens is bromine; dichloromethane is substantially unreacted under substantially identical conditions, although 1,2 dichloroethane will react.

In the preferred process of this invention, the thiophosphoric acid is neutralized to a pH between 6 and 8 with a dilute aqueous alkali, e.g., NaOH, KOH, NH$_4$OH, Ca(OH)$_2$ or an alkaline amine. Dibromomethane or bromochloromethane is then added over a short period of time and the reaction mixture is heated for two or more hours until the reaction is complete. The precipitated product, generally an oil, is separated from the aqueous salt solution by decantation, and is then filtered, washed and dried.

Alternately, the product may be made in an organic solvent such as a lower alcohol, dioxane, pyridine or similar medium which will not react with the methylene halide. However, results are not as satisfactory as with the preferred aqueous medium. Separation of the product is substantially more difficult, and the reaction times are somewhat longer.

The following examples illustrate the methods of this invention. There are, of course, many modifications which may be successfully employed by those skilled in the art, and which do not depart from the scope of the invention as defined in the claims.

EXAMPLE 1

*Preparation of bis(S-[diethoxyphosphinothioyl]mercapto)-methane*

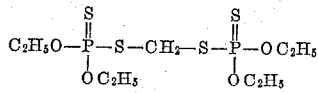

Two molar equivalents of O,O-diethyl hydrogen phosphorodithioate were dissolved in sufficient ethanol to give a four molar solution. A 20% solution of potassium hydroxide in ethanol was added slowly, the temperature maintained below 50° during the addition, until the pH of the solution was approximately 7.0. To the neutral solution was added 1 molar equivalent of dibromomethane and the mixture was heated under reflux for six hours. The precipitated solid potassium bromide was filtered off, and the filtrate was concentrated under vacuum. The residue after removing the solvent was diluted with ether, the solution washed with two volumes of water and the ethereal layer dried. The dried solution was concentrated under vacuum to give 0.74 molar equivalent of a colorless liquid having an $n_{25}D$ 1.5315. Analysis: Calcd. for $C_9H_{22}O_4P_2S_4$: P 16.13, S 33.34; P/S ratio 0.50. Found: P 16.04, S 33.72; P/S ratio 0.51.

When the dibromomethane in the above procedure was replaced by chlorobromomethane, 0.78 molar equivalent of colorless liquid having an $n_{25}D$ 1.5285 was obtained. Bio-assay, and chemical analysis, indicated the two products to be identical. Analysis: Calcd. for $C_9H_{22}O_4P_2S_4$: P 16.13, S 33.34; P/S 0.50. Found: P 16.25, S 33.63; P/S ratio 0.50.

EXAMPLE 2

*Bis(S-[dicyclohexyloxyphosphinothioyl]mercapto)-methane*

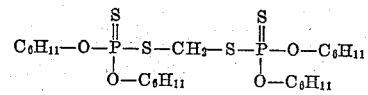

Two molar equivalents of O,O-dicyclohexyl hydrogen phosphorodithioate were neutralized by addition of 20% ethanolic potassium hydroxide, the temperature maintained below 50° during the addition, and to the neutral solution was added one molar equivalent of dibromomethane. The mixture was heated under reflux for 2.5 hours and the reaction mixture treated as described in Example 1 to give 0.40 molar equivalent of a viscous orange-brown liquid having an $n_{25}D$ 1.5290. Analysis: Calcd. for $C_{25}H_{46}O_4P_2S_4$: P 10.32, S 21.34; P/S ratio 0.50. Found: P 10.45, S 21.29; P/S ratio 0.51.

EXAMPLE 3

*Bis(S-[diethoxyphosphinyl]mercapto)-methane*

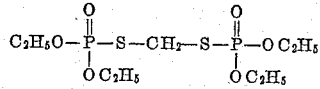

To an ethanolic solution containing 2 molar equivalents of sodium O,O-diethylphosphorothiolate, prepared by reaction of elemental sulfur with O,O-diethyl phosphite according to the procedure of Fiszer, et al. (Chem. Abstracts, 49, 3 86 [1955]), was added one molar equivalent of dibromomethane. The reaction mixture was heated under reflux for six hours and the product recovered as described in Example 1, to give 0.23 molar equivalent of dark red liquid having an $n_{25}D$ 1.4678. Analysis: Calcd. for $C_9H_{22}O_6P_2S_2$: P 17.58, S 18.20; P/S ratio 1.00. Found: P 19.80, S 20.40; P/S ratio 1.00.

The following products were prepared following the general procedure outlined in Example 1 to indicate that the substituents, R¹ and R², can be alkyl, cycloalkyl, aryl and chloraryl.

percent NaOH which brought the pH to 8. Three successive batches gave yields of 79.5 percent, 78.6 percent and 78.6 percent of theoretical, respectively. The miti-

TABLE 1.—PHOSPHINOTHIOYL- AND PHOSPHINYLMERCAPTOMETHANES

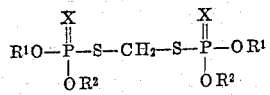

| Compound | | | $n_{25}D$ | Analysis | |
|---|---|---|---|---|---|
| R¹ | R² | X | | Theory | Found |
| Methyl | Methyl | S | 1.5247 | P—18.89 | P—17.39 |
| Ethyl | Ethyl | S | 1.5315 | P—16.13 | P—16.04 |
| Ethyl | Ethyl | O | 1.4678 | P—17.58 | P—19.80 |
| n-Propyl | n-Propyl | S | 1.5220 | P—14.08 | P—14.04 |
| Isopropyl | Isopropyl | S | 1.5163 | P—14.08 | P—14.06 |
| n-Butyl | n-Butyl | S | 1.5110 | P—12.49 | P—12.18 |
| Isobutyl | Isobutyl | S | 1.5088 | P—12.49 | P—12.18 |
| Ethyl/isopropyl (1:1) | Ethyl/isopropyl (1:1) | S | 1.5258 | P—15.04 | P—15.09 |
| Ethyl/isopropyl (3:1) | Ethyl/isopropyl (3:1) | S | 1.5298 | P—15.57 | P—15.60 |
| Cyclohexyl | Cyclohexyl | S | 1.5290 | P—10.32 | P—10.49 |
| Phenyl | Phenyl | S | 1.5722 | P—10.74 | P—10.83 |
| p-Chlorophenyl | p-Chlorophenyl | S | 1.5805 | P— 8.67 | P— 8.51 |
| Ethyl | Phenyl | S | 1.5350 | P—12.87 | P—12.47 |

Other organic radicals, such as aralkyl and alkaryl hydrocarbon radicals, can also be substituted.

EXAMPLE 4

Preparation of bis(S[diethoxyphosphinothioyl]mercapto)-methane. 279 grams (one and one-half mols) of O,O-diethyl hydrogen phosphorodithioate were dissolved in the 20 percent solution of 85.5 grams (1.5 mols) of KOH to give a solution with a pH of 6.5. The ethanol was removed and replaced with 200 millimeters of dioxane. 130.5 grams of dibromomethane (0.7 mol) were added and the solution was refluxed for four hours. The mixture was cooled; the resultant precipitate was filtered, and the oily product recovered. The yield was 87.5 percent of theoretical.

EXAMPLE 5

Example 5 was repeated but the dibromomethane was replaced by bromochloromethane. The yield was 90.5 percent of theoretical.

When Examples 4 and 5 were repeated using dichloromethane, the products were obtained in very much lower yield, and the refractive index of the material was substantially lower than that obtained with dibromomethane or with bromochloromethane, indicating a different constitution.

EXAMPLE 6

Aqueous preparation of bis(S[diethoxyphosphinothioyl]mercapto)-methane. 200 lbs. of O,O-diethylphosphorodithioate were placed in a reaction vessel and neutralized with 174 lbs. of 25 percent aqueous caustic soda; the pH was brought back from 9 to 8 by adding 9 more lbs. of the acid; temperature rose from about 20° C. to 32° C. during the addition. The batch was heated to 50° C. and 88 lbs. of dibromomethane were added over a period of one-half hour during which time the temperature rose to 72° C. The batch was then heated for three hours at 80–85° C. at which time reaction appeared complete. The batch was washed by decantation, first with 45 gallons of water and then with 25 gallons of water; the product was filtered to remove impurities, reslurried with water and allowed to settle. The oily liquid was drawn off; it weighed 163 lbs., representing a 75 percent yield. The miticidal activity of this batch was compared with a standard made in the laboratory, and was found to be somewhat superior.

EXAMPLE 7

The process of Example 6 was repeated substituting 70 lbs. of bromochloromethane for the 88 pounds of dibromomethane. In this case, 200 lbs. of the O,O-diethylphosphorodithioate were neutralized with 167 lbs. of 25 cidal activity was somewhat better than that of laboratory prepared material.

The specific examples can be modified without departing from the scope of the invention which is set forth in the claims.

What is claimed is:
1. The method for preparing a compound of the formula

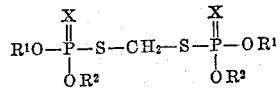

where X is selected from the group consisting of oxygen and sulfur and R¹ and R² are organic radicals selected from the group consisting of alkyl, cycloalkyl, aryl and chloraryl which comprises heating about 1 mol of a compound of the class consisting of dibromomethane and chlorobromomethane with about 2 mols of a salt of a thiophosphoric acid of the formula

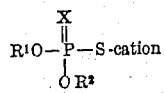

where X is selected from the group consisting of oxygen and sulfur and R¹ and R² are organic radicals selected from the group consisting of alkyl, cycloalkyl, aryl and chloraryl, in an inert solvent for the salt, until reaction is complete, and separating the halide formed from the resultant bismethylene compound.

2. The method for preparing a compound of the formula

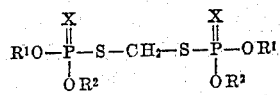

where X is selected from the group consisting of oxygen and sulfur and R¹ and R² are organic radicals selected from the group consisting of alkyl, cycloalkyl, aryl and chloraryl which comprises heating about 1 mol of a compound of the class consisting of dibromomethane and chlorobromomethane with about 2 mols of a salt of a thiophosphoric acid of the formula

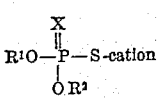

where X is selected from the group consisting of oxygen and sulfur and R¹ and R² are organic radicals selected from the group consisting of alkyl, cycloalkyl, aryl and chloraryl in an aqueous medium, until reaction is complete, and separating the halide formed from the resultant bismethylene compound.

3. The method of preparing bis(S-[diethoxyphosphinothioyl]mercapto)-methane which comprises heating about 1 mol of a compound of the class consisting of dibromomethane and bromochloromethane with about 2 mols of a salt of O,O-diethyl hydrogen phosphorodithioate in an inert solvent for the salt, until reaction is complete, and separating the halide formed from the resultant bismethylene compound.

4. The method of preparing bis(S-[diethoxyphosphinothioyl]mercapto)-methane which comprises heating about 1 mol of a compound of the class consisting of dibromomethane and bromochloromethane with about 2 mols of a salt of O,O-diethyl hydrogen phosphorodithioate in an aqueous medium, until reaction is complete, and separating the halide formed from the resultant bismethylene compound.

References Cited in the file of this patent
UNITED STATES PATENTS

| | | |
|---|---|---|
| 2,266,514 | Romieux et al. | Dec. 16, 1941 |
| 2,531,129 | Hook et al. | Nov. 21, 1950 |
| 2,841,520 | Willard et al. | July 1, 1958 |

FOREIGN PATENTS

| | | |
|---|---|---|
| 535,946 | Canada | Jan. 15, 1957 |

OTHER REFERENCES

Clark et al.: J. Agr. Food Chem., 3, 834–836 (1955).